Figure 7:
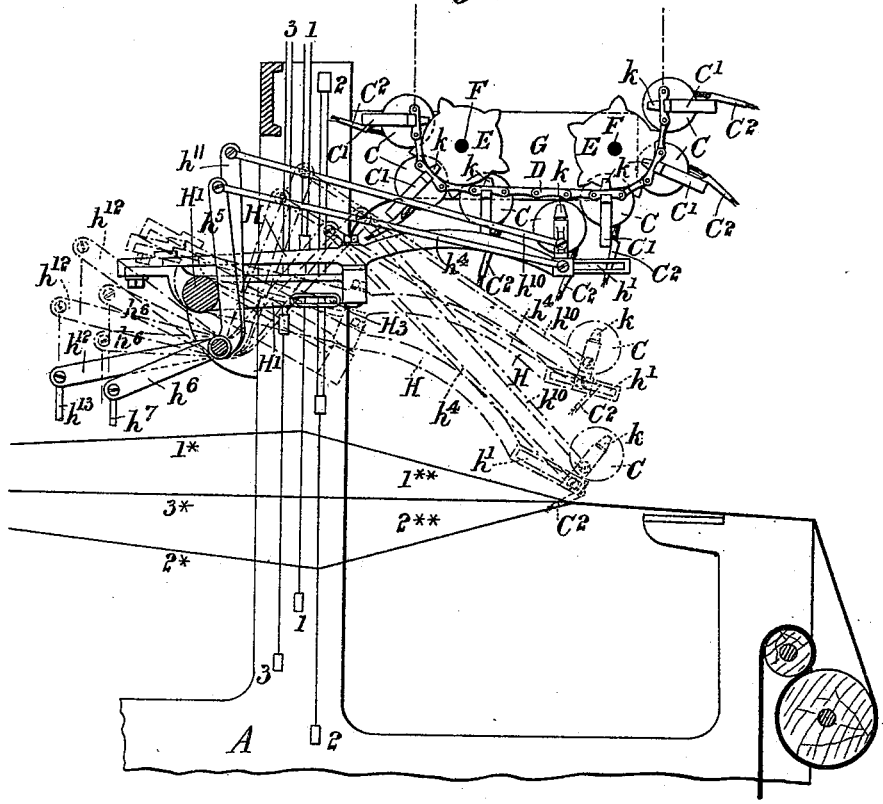

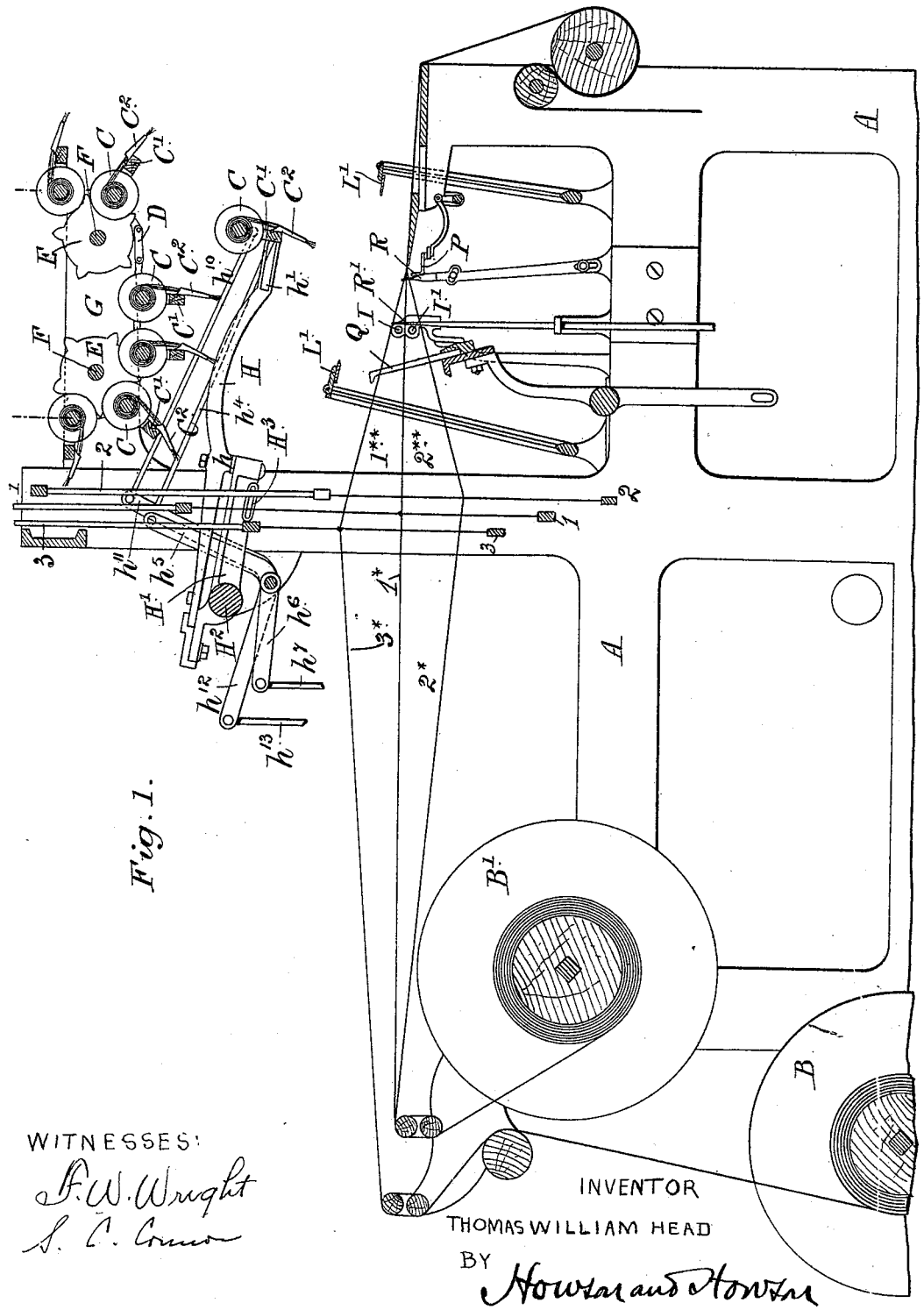

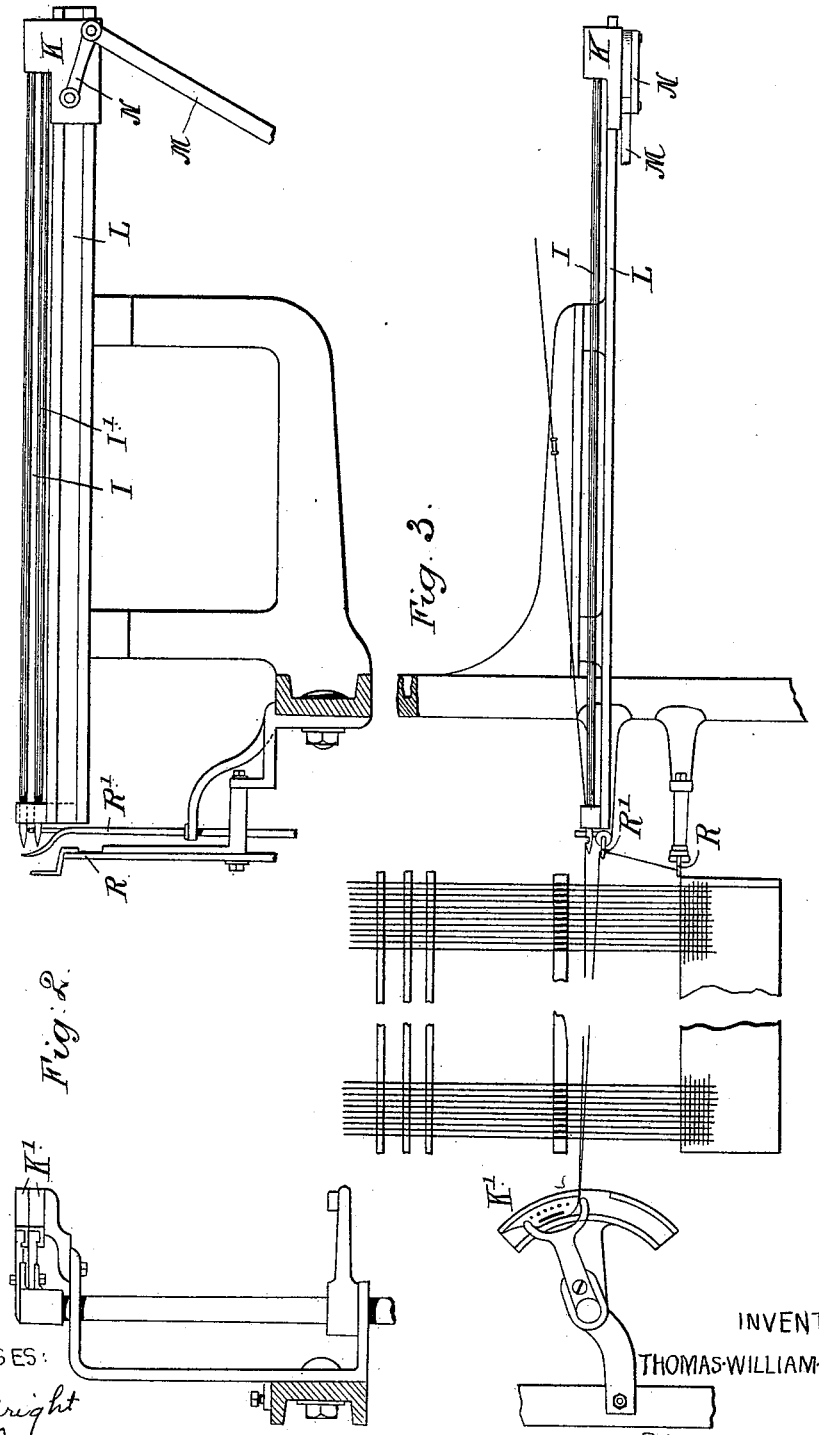

No. 619,956. Patented Feb. 21, 1899.
T. W. HEAD.
LOOM FOR WEAVING TUFTED FABRICS.
(Application filed Dec. 1, 1897.)
(No Model.) 6 Sheets—Sheet 3.
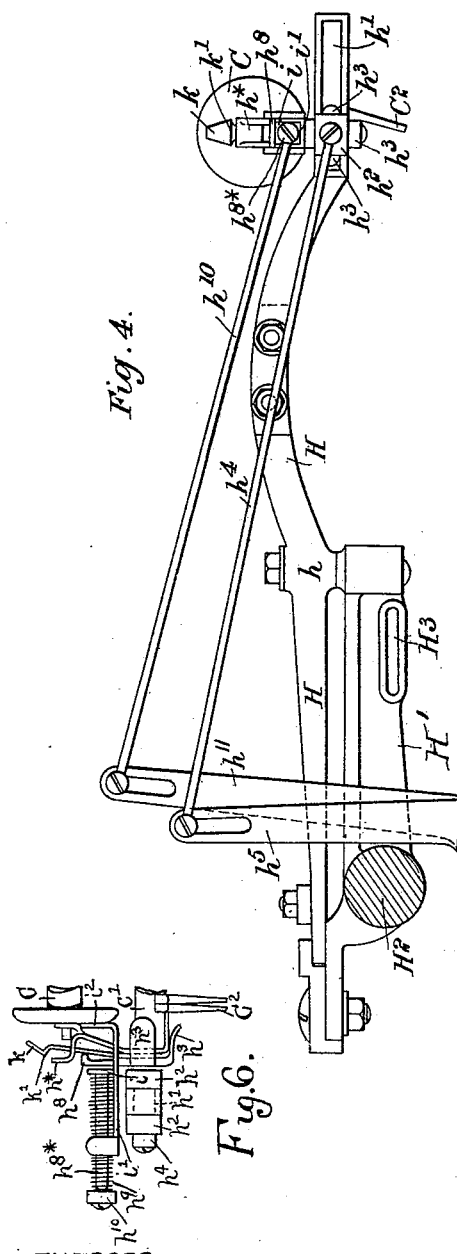
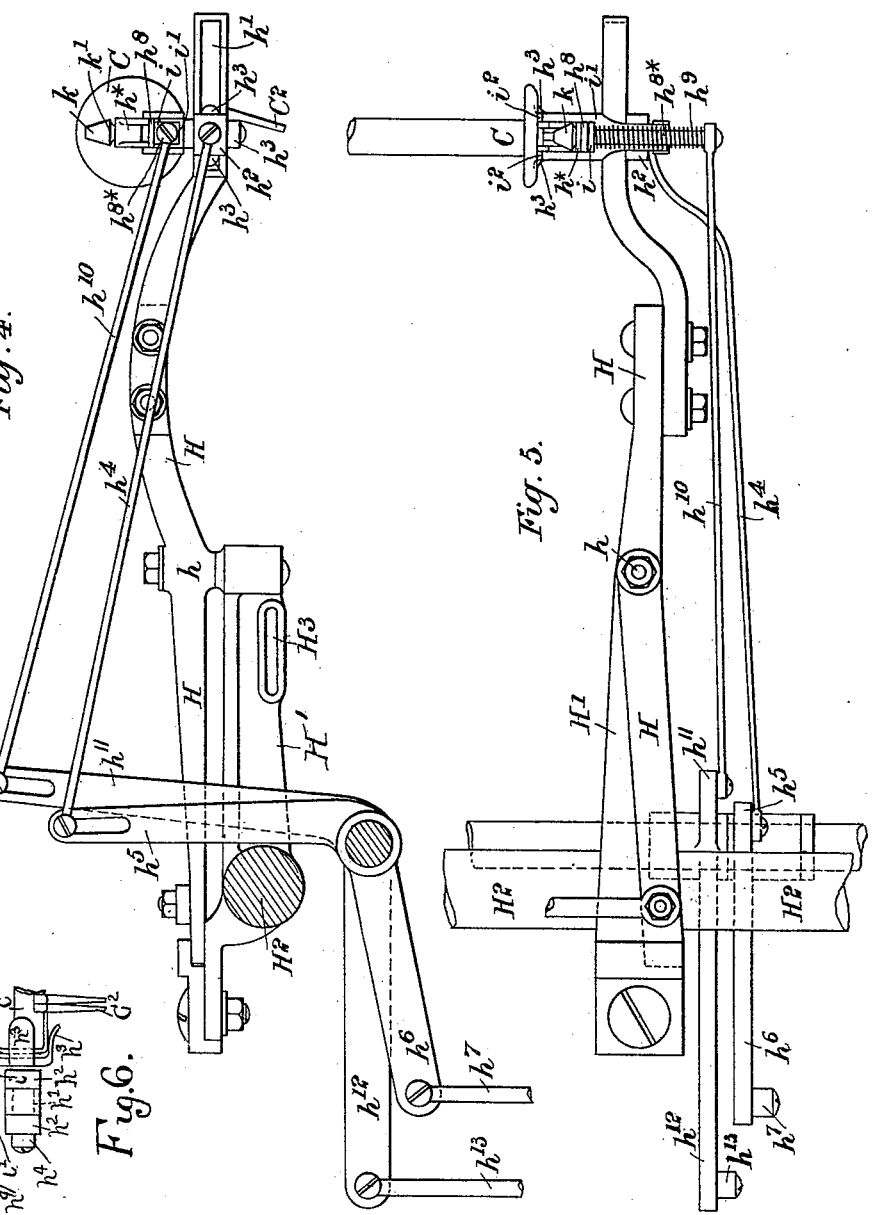
WITNESSES:
F. W. Wright
S. C. Connor
INVENTOR
THOMAS WILLIAM HEAD
BY Howson and Howson
HIS ATTORNEYS.

No. 619,956. Patented Feb. 21, 1899.
T. W. HEAD.
LOOM FOR WEAVING TUFTED FABRICS.
(Application filed Dec. 1, 1897.)
(No Model.) 6 Sheets—Sheet 4.

WITNESSES:
F. W. Wright
S. C. Connor

INVENTOR
THOMAS WILLIAM HEAD
BY
Howson and Howson
HIS ATTORNEYS

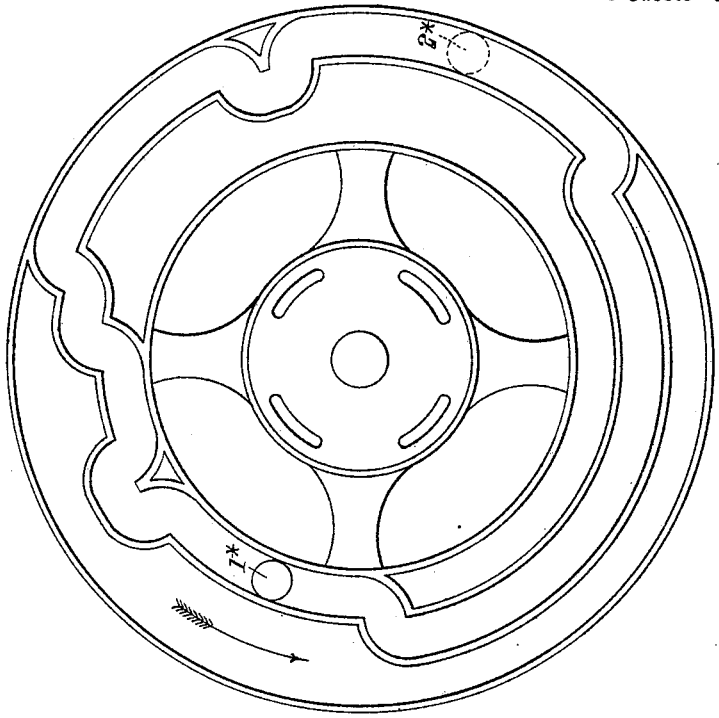
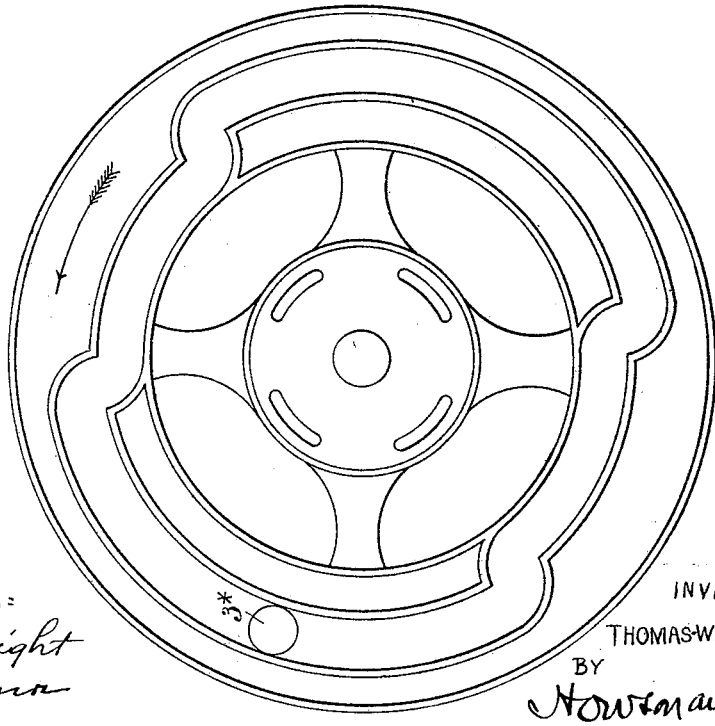

No. 619,956. Patented Feb. 21, 1899.
T. W. HEAD.
LOOM FOR WEAVING TUFTED FABRICS.
(Application filed Dec. 1, 1897.)
(No Model.) 6 Sheets—Sheet 6.

WITNESSES:
F. W. Wright
M. H. Miles

INVENTOR
T. W. HEAD
BY
Howson and Howson
HIS ATTORNEYS.

United States Patent Office.

THOMAS W. HEAD, OF BRIDGNORTH, ENGLAND, ASSIGNOR OF ONE-HALF TO THE H. & M. SOUTHWELL, LIMITED, OF SAME PLACE.

LOOM FOR WEAVING TUFTED FABRICS.

SPECIFICATION forming part of Letters Patent No. 619,956, dated February 21, 1899.

Application filed December 1, 1897. Serial No. 660,396. (No model.)

*To all whom it may concern:*

Be it known that I, THOMAS WILLIAM HEAD, loom-tuner, a subject of the Queen of Great Britain and Ireland, residing at Bridgnorth, in the county of Salop, England, have invented certain Improvements in Looms for Weaving Tufted Fabrics, of which the following is a specification.

This invention relates to looms for weaving tufted fabrics, of which those known as "moquette" carpets or "Royal Axminster" carpets are examples, the said fabrics having a body of warp and weft threads and a face consisting of rows of tufts secured by the warp and weft threads. It is usual in most looms of this description for the tuft-spools to be conveyed by transferring-arms successively from the spool-carriers (usually two endless chains) and when the ends of the tufts have been inserted between the warp-threads for the tuft-spool to be held in that position till a shot of weft has been taken across by a weft-carrier and been pressed up by the lay. After the tufts have been thus securely bound into the body of the fabric and the tuft-yarns cut off the transferring-arms return the tuft-spool to the spool-carriers and wait in that position till another tuft-spool is advanced before repeating the process.

This invention provides an improved movement in connection with the transferring-arms, which allows the tuft-spools to be brought forward while the transferring-arms are engaged in their other movements and by the saving of time thus effected at the change of the tuft-spools to materially increase the capacity of the loom. The spool-carriers are arranged to move on stationary supports, the lower portions of which said carriers are always in a horizontal plane, so that when the transferring-arms return a tuft-spool to the empty space in the carriers the said transferring-arms can be made to rock or slide horizontally to the next spool, and after taking the said spool from the spool-carrier convey it to the position necessary for the insertion of the tufts into the body of the fabric, during which operation the tuft-spool carriers advance, bringing the empty link-space into position to receive the tuft-spool which had been removed and also bringing the next tuft-spool into the necessary position to be removed by the transferring-arms. The springs, in connection with the spool-frames by which the tuft-spools are held in the spool-carriers, are provided with parts which bear on the said spool-carriers, wider than are those now in use, whereby the spools are kept steady in the carriers.

The invention also consists in operating the heddles whereby more than one opening or shed can be obtained at the same time, thus enabling two or more weft-carriers to be used simultaneously for inserting the necessary weft between the warp-threads, thereby considerably reducing the time usually taken for that purpose. Means are also provided whereby the weft used for the binding of the tufts can be placed between the warp-threads before the insertion of the tufts and held in position in the sheds, so that as soon as the tufts are in position between the warp-threads the said weft can be pulled up tightly on the selvages and be beaten up by the lay to bind the tufts in the body of the fabric, the said means consisting of fingers or points which hold the binding-weft in the open part of the shed till the next series of tufts is inserted.

By this invention of the combination of tuft-inserting devices, with a plurality of weft-carriers and multiple shed-forming mechanism, the time required for the inserting of the weft-threads between the warp-threads is considerably reduced, and by the insertion of the weft-threads for the binding of the tufts before the insertion of the said tufts, in combination with the improved method of returning and again taking the tuft-spools and advancing the tuft-spool carriers for the next row of tufts, the capacity of the loom is materially increased.

In order that this invention may be well understood, I will describe the same with reference to the accompanying drawings, of which—

Figure 8:
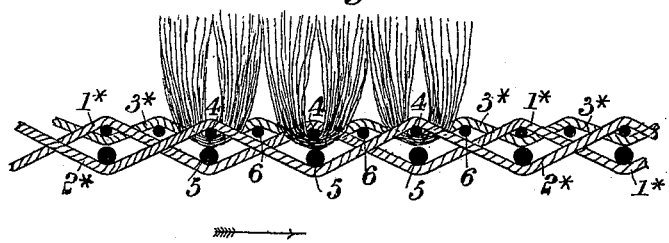
Figure 11:
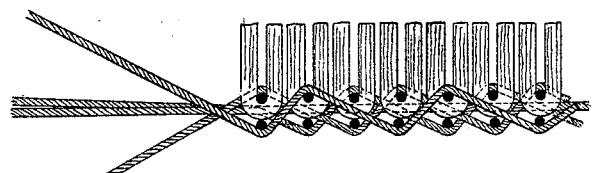
Figure 6A:
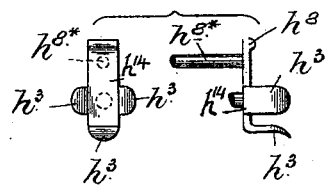
Figure 12:
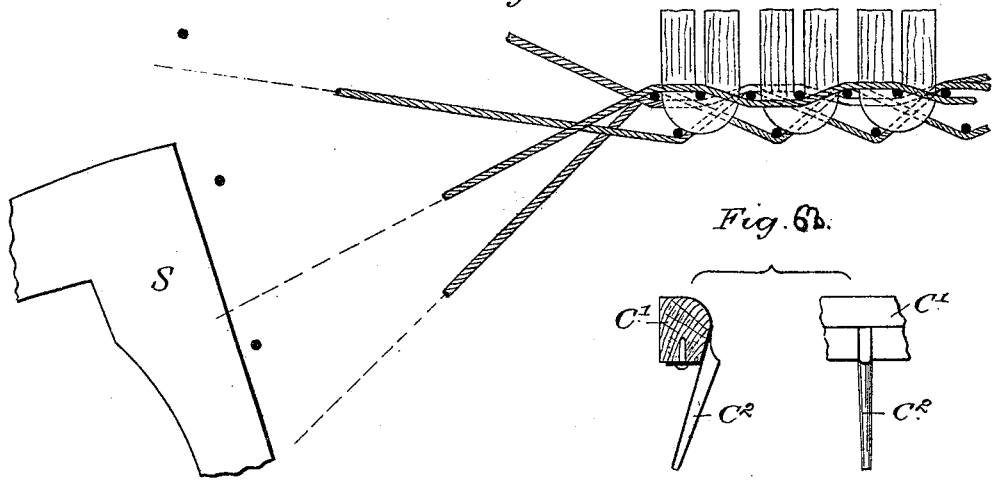
Figure 6B:
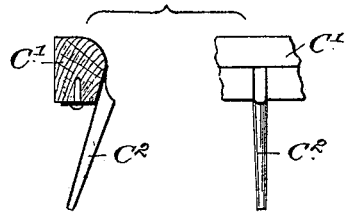

Figure 1 represents in longitudinal sectional elevation so much of a tuft-loom as is necessary to illustrate the invention. Looms of this character being well known I have not considered it necessary to show the cams employed for giving motion to the various parts except those for operating the heddles, it being understood that all the cams are suitably shaped and timed to effect in the order required the various movements hereinafter described. Fig. 2 is an elevation, and Fig. 3 a plan, of the weft-carriers employed in the example given, it being understood that instead of the needle weft-carriers, as shown, shuttles or other descriptions of weft-carriers may be employed except as hereinafter specifically claimed. In Figs. 2 and 3 are also shown the usual shuttle for locking the weft-threads and forming the selvage on one edge of the fabric. Figs. 4 and 5 are respectively a side elevation and a plan of one of the transferring-arms engaged with a tuft-spool. Fig. 6 is a view at one end thereof. Fig. 6$^a$ shows in side and end view a part of the means for engaging the tuft-spool frames, and Fig. 6$^b$ shows in elevation and section a part of a tuft-spool frame and a tuft-guide carried thereby. Fig. 7 is a view showing by full lines and dotted lines different positions the transferring-arms and engaging fingers assume in conveying a tuft-spool from the tuft-spool carriers into position for inserting the tufts. Fig. 8 is an enlarged view of the weave hereinafter more particularly described, and Figs. 9 and 10 represent the cams which operate the heddles to produce the said weave. Fig. 11 is an enlarged view of a two-shot weave by the simultaneous insertion of two wefts, and Fig. 12 shows an enlarged view of a three-shot weave which can be made by the simultaneous insertion of three wefts.

A is the frame of the loom; B B', the warp-beams, (shown in Fig. 1;) 1 2 3, three heddles operated by cams, so as to form two sheds at a time, the heddles 1 2 operating the warps $1^\times$ $2^\times$ and the heddle 3 operating the dead-warp $3^\times$. The cam for operating the heddle 3 is shown in Fig. 9, one of the two cams (which are both alike) for operating the heddles 1 and 2 being shown in Fig. 10. The relative positions of the studs engaging these two cams are as shown by full-line circles $1^\times$ and by dotted circle $2^\times$ and that engaging the cam, Fig. 9, by full-line circle $3^\times$.

Numbers 4, 5, and 6 (see Fig. 8) are weft-threads, two of which 4 6 are inserted in the upper sheds, the other weft-thread 5 being inserted in the lower sheds.

C are tuft-spools mounted in the usual frames C', having tubes or guides C$^2$ for inserting the tufts.

D is the tuft-spool carrier consisting of endless chains engaging sprocket-wheels E, turning on axes F in stationary supports G, shown in the drawings as part of the frame of the loom.

H are the transferring-arms by which the tuft-spools are removed from and returned to the tuft-spool carriers, the said tuft-spool carriers being caused to move intermittently by pawl-and-ratchet motion and suitably-timed cam or cams to bring the empty space in the spool-carriers from which a spool has been removed by the transferring-arms into position to have the said spool reinserted, as hereinafter described.

I I' are needles or weft-carriers (see Figs. 2 and 3) by which the weft-threads are inserted in the sheds formed in the warp-threads by the heddles 1, 2, and 3. The needles I I' are fixed in a holder K, arranged to slide to and fro in or on a guide L, it being operated by means of a cam through the rod M and link N, connected to the said holder K. A shuttle is provided for each needle or weft-carrier to secure the weft-threads and form the selvage on the edge of the fabric in the usual manner.

P is the comb by which the tuft ends inserted in the warp-threads are turned back to the face of the fabric to be secured by the binding weft-threads, and Q is the lay by which weft-threads are beaten up.

R R' are retaining fingers or projections for holding the inserted weft-threads in position for the tufts to be inserted between the said weft-threads, the said fingers being caused to rise and descend by suitably-timed cam or cams, so as to engage the weft-threads while the tufts are being inserted and then to descend so as to release the wefts to admit of them being pulled up tightly on the selvages and then beat up by the lay.

The transferring-arms H are arranged one on each side of the loom and are connected together by rods and connecting-links, as usual, so as to operate simultaneously to engage the tuft-spools, insert the tufts, and return the spools to the spaces in the spool-carriers from which they are removed. Each transferring-arm is pivoted at $h$ to a support H' to permit of it moving in a horizontal plane to engage and release the spools in the ordinary manner, and the support H' is mounted on a horizontal axis H$^2$ and caused to oscillate in a vertical plane (by means of a cam acting on a lever and rod connected at H$^3$ to the said support H') into a position to engage the tuft-spools in the tuft-spool carriers, and then to descend with the said spool into position to insert the tufts in the fabric, and then to rise and reinsert the spool in the space in the carriers from which it had been removed. The forward end of each transferring-arm is slotted, as shown at $h'$, in which slot is fitted, so as to slide therein or therealong, a block $h^2$, (see Fig. 4,) having pivoted thereto a piece $h^{14}$, Fig. 6$^a$, with fingers $h^3$ to engage the frames C', in which the tuft-spools are pivoted. The sliding block $h^2$ is connected by a rod $h^4$ to one arm $h^5$ of a bell-crank lever, the other arm $h^6$ of which bell-crank lever is acted on through a rod $h^7$ by a cam suitably timed to cause the block $h^2$ to reciprocate in the slot $h'$ at the required periods. The pivoted piece carried by the sliding block has an arm $h^8$, from which projects a stud $h^{8\times}$, surrounded by a helical spring $h^9$, which stud is connected by a rod $h^{10}$ to one arm $h^{11}$ of a bell-crank lever, the other arm $h^{12}$ of which lever is operated by a cam through a rod $h^{13}$, so as to cause the pivoted piece having the engaging fingers $h^3$, together with the tuft-spool engaged thereby, to turn in the block $h^2$, so as to insert the tufts at the required angle between the warp-threads. The helical spring $h^9$, surrounding the stud $h^{8\times}$, bears at one end against the end of the connecting-rod $h^{10}$ and at its opposite end against a lug $i$ on a plate $i'$, through which lug the stud $h^{8\times}$ passes. The inner end of the plate $i'$ is forked and bent upward at right angles to the longitudinal portion of the plate, as shown at $i^2$, which bent-up parts are caused by the spring $h^9$ to press against the end of the spool when engaged by the fingers $h^3$ and so prevent the spool from turning too freely in its bearings while the tuft-yarn is being drawn from the said spool. The frame $C'$, in which the tuft-spool is mounted, is provided at each end with a projection $h^\times$, which enter links in the tuft-spool carriers, and also with a blade-spring $k$, having a shoulder $k'$, which when the tuft-spool is inserted in the tuft-spool carriers engage with the said links and retain the spool in position. When the tuft-spool is engaged by the transferring-arms, the springs $k$ are pressed by the projections or arms $h^3$ out of engagement with the links of the tuft-spool carriers, so as to admit of the spool being removed from the carriers by the said transferring-arms.

The operation of weaving a tufted fabric according to this invention will be readily understood from the following description without detailing the action of all parts of the loom, it being understood, however, that I do not restrict myself to the precise weave nor to the construction and arrangement of parts described, as variations in the weave and arrangement of mechanism can be adopted without departing from the broad principle of this invention. For instance, by the use of the double shed and two weft-carriers a fabric with only two shots of weft, as shown in Fig. 11, can be made in less time than can be made in ordinary two-shot time-looms, as by the simultaneous insertion of the foundation shot and the binding shot the necessity for the second insertion of the weft-carriers is obviated.

Suppose the two sheds $1^{\times\times}$ and $2^{\times\times}$ to be formed in the warp, as shown in Fig. 1, and the transferring-arms H to be rising to insert the tuft-spool which they carry into the empty space in the tuft-spool carriers. The weft-needles I I', carrying the weft-threads 6 and 5, respectively, are caused to enter the sheds, the needle I, with the weft-thread 6, entering the shed $1^{\times\times}$, and the needle I', with the weft-thread 5, entering the shed $2^{\times\times}$. The inserted weft-threads are secured by shuttles K' K' in the usual manner, except that instead of a single shuttle two shuttles are preferably provided, corresponding to the two needles or weft-carriers I I', after which the needles are withdrawn and the said wefts 5 6 are beat up by the lay Q. The wefts 6 5 having been beaten up, the heddles are caused by their cams, Figs. 9 and 10, to change the sheds, the warps $1^\times$, which, with the warps $3^\times$, had formed the shed $1^{\times\times}$, reversing their positions, as shown in Fig. 7, while the heddle governing the warp $2^\times$ still remains in the position shown in Fig. 1 and helping to form the lower shed $2^{\times\times}$. The weft-carriers or needles I I' are now caused to enter the newly-formed sheds, the upper needle I only carrying a weft-thread 4 into the upper shed, the needle I' entering the lower shed without a weft-thread. As will be seen on reference to Figs. 9 and 10, the heddle-cams are arranged to make only one revolution to every two revolutions of the cam-shaft, the heddles 2 and 1 reversing their positions. As the needles are about to enter the sheds the finger R' is caused to rise into position to engage the weft-thread 4, so as to hold the said weft-thread at a distance in the more open portion of the shed, as shown in Fig. 3, to admit of a row of tufts being inserted between the said weft-thread and the previously beaten-up wefts 6 and 5. The transferring-arms H, which have been operated so as to engage with a tuft-spool in the tuft-spool carrier, now descend with the spool and insert the protruding ends of the tuft-yarns between the inserted and beat-up wefts 5 and 6 and the inserted weft 4. While the transferring-arms are descending the sliding blocks $h^2$, together with the fingers $h^3$, engaging the spool, are caused to slide toward the outer ends of the slots $h'$, as shown by dotted lines in Fig. 7, and at the same time the pivoted pieces, with the fingers $h^3$, which engage the frame C', are caused to turn on their pivots in the sliding blocks $h^2$, so as to insert the tufts in an angular direction, as shown in Fig. 7. The ends of the tufts having been inserted and the weft pulled up tightly on the selvages, the lay moves forward and beats up the weft 4, thereby holding the tufts in the fabric. The comb P then ascends and bends upward the ends of the tufts around the said weft 4, and the sheds are changed by the heddles, and after the transferring-arms have been raised to such an extent as to draw from the tuft-spool sufficient yarn to form the tufts the cutters L' L' come into action to separate the tufts from the spool. During these operations the tuft-spool carriers have a movement given to them by means of a cam and pawl-and-ratchet arrangement, so as to bring the empty space from which the spool had been removed into position to receive the said spool from the transferring-arms, the next spool in the carriers being also brought into position to be engaged by the said transferring-arms. The tufts having been separated from the spool, the transferring-arms rise and reinsert the spool in the empty space in the tuft-spool carriers, after which the blocks $h^2$, carrying the engaging fingers $h^3$, are caused to slide backward in the slots $h'$ in the ends of the transferring-arms, so as to bring them opposite the next spool to be engaged, and the said arms are turned on their pivots $h$, so as to cause the fingers to engage the said spool. During these movements wefts 6 and 5 are inserted in the sheds, and the sheds are changed and the weft 4 inserted in the upper shed, as before. The arms H now descend with the spool, so as to insert another row of tufts, and the operations hereinbefore described are repeated.

By means of this invention a more equal distribution of the time in which the various motions hereinbefore described are effected, and the motions take place without waiting and more in unison with each other, whereby although the movements of the parts may be slower than usual a greater amount of work is produced in a given time than is the case with looms of this character as heretofore constructed.

By the use of the double shed and two weft-carriers a fabric with only two shots of wefts, as shown in Fig. 11, can be made in less time than can be made in ordinary two-shot time-looms, as by the simultaneous insertion of the foundation shot and the binding shot the necessity for the second insertion of weft-carriers is obviated. By providing an additional heddle and cam for operating it and an additional needle or weft-carrier three sheds can be formed at the same time and three shots of weft be inserted simultaneously to weave a three-shot fabric, as shown in Fig. 12, in a very rapid manner. In both these cases the shots of weft inserted in the lower shed or sheds is or are moved forward by the ordinary blade S before a row of tufts is inserted, the shot in the uppermost shed being retained by the finger R', hereinbefore described, the said shot being beat up by the lay after the row of tufts is inserted.

Having now particularly described and ascertained the nature of this invention and in what manner the same is to be performed, I declare that what I claim is—

1. In a loom for weaving tufted fabrics, the combination of means for inserting the tufts, with a plurality of weft-carriers, means for simultaneously actuating them, and means for simultaneously forming multiple sheds in the warps to allow the insertion of the necessary wefts to bind the tufts, substantially as hereinbefore described.

2. In a loom for weaving tufted fabrics, the combination of means for inserting the tufts and means for simultaneously introducing a plurality of wefts, with an engaging pin or engaging pins or its or their equivalent and acting to hold the weft-threads in position in the shed, to permit of the insertion of the tufts in position in the warp-threads after the wefts have been inserted, substantially as hereinbefore described.

3. In a loom for weaving tufted fabrics, the combination with tuft-spool carriers and stationary supports therefor, of transferring-arms having engaging fingers movable longitudinally of said arms, means for moving the transferring-arms and means for imparting intermittent horizontal movements to the said tuft-spool carriers to bring the space in the carriers from which the tuft-spool had been removed by the transferring-arms, into position to receive the said spool from the transferring-arms as they rise from the fabric after inserting a series of tufts, and means whereby the engaging fingers carried by the transferring-arms are caused to move longitudinally (after inserting the spool into the empty space in the carriers) into position to engage the next tuft-spool in the spool-carriers, substantially as hereinbefore described.

4. In a loom for weaving tufted fabrics, the combination of tuft-spools, carriers therefor, and stationary supports for the carriers, with transferring-arms and means whereby the tuft-spools are caused to slide on the arms, substantially as and for the purpose hereinbefore described.

5. In a loom for weaving tufted fabrics, the combination of tuft-spools, carriers therefor, and stationary supports for the carriers, with transferring-arms, blocks provided with fingers which engage the tuft-spools, and means for causing said blocks to slide on said arms, substantially as hereinbefore described.

6. In a loom for weaving tufted fabrics, the combination of means for inserting the tufts, with two or more weft-carriers, means for simultaneously operating the weft-carriers, means for simultaneously forming two or more sheds in the warps to allow the insertion of necessary wefts, and means for retaining one of the wefts in the open portion of one of the sheds, while a row of tufts is inserted, substantially as described.

In testimony whereof I have signed my name to this specification in the presence of two subscribing witnesses.

T. W. HEAD.

Witnesses:
E. SARJEANT,
FRANK W. SOUTHWELL.